March 12, 1940.  T. A. RICH  2,193,646
INERTIA TACHOMETER
Filed Aug. 27, 1938

Inventor:
Theodore A. Rich,
by Harry E. Dunham
His Attorney.

Patented Mar. 12, 1940

2,193,646

UNITED STATES PATENT OFFICE 2,193,646

INERTIA TACHOMETER

Theodore A. Rich, Schenectady, N. Y., assignor to General Electric Company, a corporation of New York Application August 27, 1938, Serial No. 227,222

8 Claims. (Cl. 264—1)

My invention relates to an inertia tachometer of a type which may be used to determine the speed of a rotating shaft. In carrying my invention into effect, I provide a small fly wheel which may be brought into driving relation with a rotating shaft the speed of which is to be measured. The fly wheel is thus rotated at a corresponding speed, and while so rotating is removed from such driving relation and immediately connected in driving relation with a spring in such a way that the kinetic energy of the fly wheel is used up in winding the spring. When the energy is thus transferred to the spring and the fly wheel has been brought to rest, the extent of winding of the spring is proportional to and may be used as a measure of the speed of the rotating shaft. Preferably a pointer is rotated by the winding operation of the spring, which pointer cooperates with a graduated scale. The device may be calibrated to read R. P. M. directly from the scale without calculations. Various refinements are incorporated to provide an inexpensive and practicable device which, after a speed measurement, retains the speed reading until reset.

Figure 1:
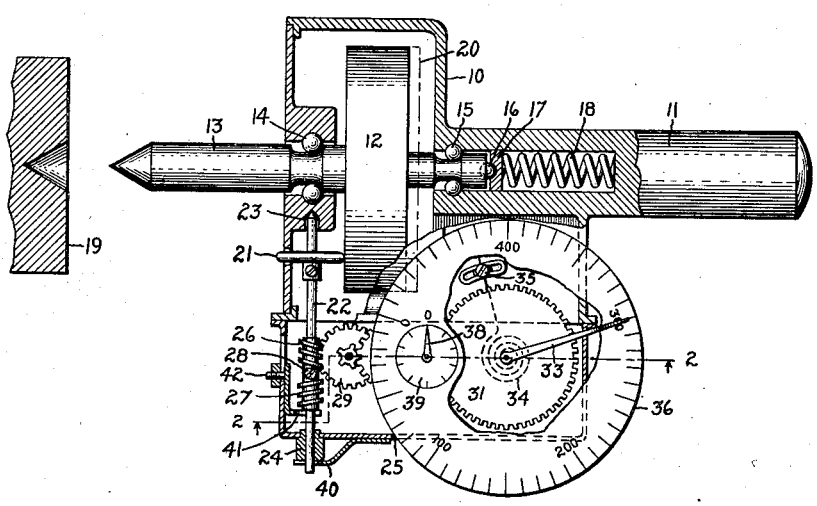
Figure 2:
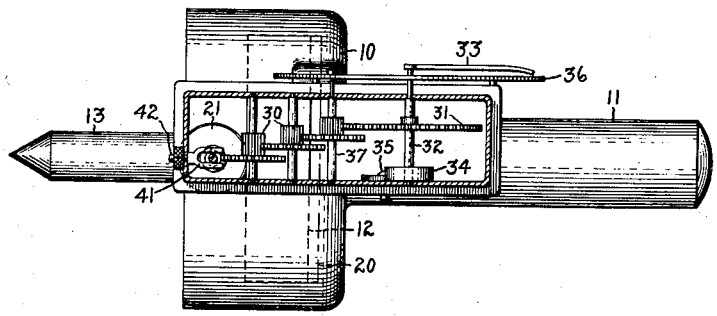

The features of my invention which are believed to be novel and patentable will be pointed out in the claims appended hereto. For a better understanding of my invention reference is made in the following description to the accompanying drawing in which Fig. 1 is a plan view partially in section of my improved inertia tachometer and Fig. 2 is a side view with the gear casing shown in section on line 2—2 of Fig. 1.

Referring to the drawing, 10 represents a casing generally cylindrical in shape and having an axially extending handle 11 preferably integral therewith. Within the casing is a fly wheel 12 secured to a shaft 13 supported in ball bearings 14 and 15 at the two ends of the casing. Shaft 13 extends outward to the front of the casing and has a tapered end suitable for inserting in a central driving recess in the end of a shaft such as the shaft indicated at 19, the speed of which is to be measured. The rear end of shaft 13 extends into a recess in the handle 11 and is there provided with a thrust bearing consisting of a ball 16 between a center recess in the end of the shaft and a slidable plug 17. The plug is backed by a compression spring 18 which urges the thrust bearing and shaft 13 with its fly wheel 12 toward the front or to the left as viewed in Fig. 1. The bearings 14 and 15 are arranged to permit limited endwise movement of shaft 13, and the dimensions of the casing are such as to allow a corresponding movement of the fly wheel therein.

When the device is thrust forward to bring shaft 13 in driving relation with shaft 19, shaft 13 and fly wheel 12 slide to the rear in casing 10 slightly from the position shown, the fly wheel moving to the position represented by the dotted line 20. Plug 17 slides back into handle 11 a corresponding amount and spring 18 is further compressed. When the device is removed from driving relation with a shaft such as 19, these endwise movable parts return to the position shown in Fig. 1 under the urge of spring 18 which remains under sufficient tension normally to hold shaft 13 in this forward position shown.

In the forward position of the fly wheel 12 its front plane surface bears against a friction wheel 21 and is in driving relation therewith. When the shaft 12 is thrust into driving relation with the shaft 19 and the fly wheel takes up the rear or dotted line position, it is not in contact with friction wheel 21. It is thus seen that the act of inserting shaft 13 into driving relation with shaft 19 automatically disengages the driving connection between wheels 12 and 21 and the removal of shaft 13 from driving relation with shaft 19 automatically establishes the driving relation between wheels 12 and 21.

Friction wheel 21 is secured to a small shaft 22 extending at right angles to shaft 13 and which is mounted in suitable bearings 23 and 24. Bearing 24 is in the side wall of a gear casing 25 in which shaft 22 extends and which casing is secured to or may be a part of casing 10. Shaft 22 is provided with a pair of gear worms 26 and 27 on a common bushing which is secured to shaft 22 by a set screw 28. The two worms are of opposite pitch, and one or the other may be brought into mesh with a worm gear 29, sliding the worms along shaft 22 and retightening the screw. This double pitch worm arrangement adapts the device for measuring the speed of a shaft, such as shaft 19, which may rotate in either direction of rotation when only one end thereof is accessible.

Worm gear 29 drives, through a speed reducing gear train 30, a gear 31 on a shaft 32, to which is secured a pointer 33 and the inner end of a spiral spring 34. The outer end of spring 34 is secured to a stationary part of the casing by a bolt 35, which bolt is preferably adjustable in an arc-shaped slot for the purpose of adjusting the spring and the zero setting of the hand 33. Hand 33 cooperates with a scale 36 which may be graduated in speed units such as R. P. M. Where more accurate readings are important, the shaft 37 next to the spring end of the gear train may be provided with a pointer 38 and cooperate with a scale 39. If the gear ratio between shaft 37 and 32 is 5 to 1, pointer 38 will make five revolutions on its dial for one revolution of pointer 33 on dial 36.

When the gears are in mesh, spring 34, although it may be under maximum tension, will not drive back through the gear train to rotate shaft 22 because of the irreversible worm gear. This is an advantage because then the speed position of pointers 33 and 38 may be read at one's leisure. To provide for the unwinding of the spring 34 and the return of the pointers to zero positions, I have provided means for disconnecting the gear train at the worm gear. To this end bearing 24 is fitted into the opening in casing 25 so that it may be pulled out toward the lower end of shaft 22 as viewed in Fig. 1. The bearing is normally held firmly in place by a spring 40 which has a forked end straddling shaft 22 but pressing inward on bearing 24. With this arrangement, bearing plug 24 may be pulled out and, when clear of its seat opening the bearing with the lower end of shaft 22, may be swung to the left as viewed in Fig. 1 to an extent sufficient for the worm 26 opposite worm wheel 29 to be disengaged therefrom. This allows spring 34 to unwind and return pointers 33 and 38 to zero positions. The worm gear is then reengaged and bearing 24 pushed back in place. This demeshing arrangement also facilitates the sliding of the worms 26 and 27 along shaft 22 when this adjustment is desired. A forked collar 41 abuts against the lower end of worm 27 and prevents shaft 22 from moving downward as viewed in Fig. 2. This collar does not rotate with the shaft but has an angular extension secured to the casing wall by a nut and bolt 42. The bolt fits in a slot in casing 25 parallel with shaft 22, and when the bolt is loosened, the forked collar may be moved along with the worms when they are shifted and then refastened in place.

In using this device, the pointers are first set at zero positions with spring 34 at zero tension. Gear 26 or 27 is put in mesh with gear 29 depending upon the direction of rotation of the accessible end of shaft 19, the speed of which is to be measured. The direction of rotation must be such as to wind spring 34 when pointer 33 is moving up scale.

The device is then grasped by handle 11 and shaft 13 is thrust into the center end recess of rotating shaft 19 and held there for a short time until fly wheel 12 is accelerated to the same speed. At this time shaft 13 has been forced to the rear and fly wheel 12 does not make contact with friction wheel 21. Hence, this clutch means is disengaged and no winding of spring 34 has yet occurred.

Kinetic energy proportional to the speed of shaft 19 is thus stored in fly wheel 12. The device is now quickly withdrawn. Rotating fly wheel 12 immediately contacts with and drives friction wheel 21 and spring 34 is wound up through the gear train represented. The gear train and parts driven by friction wheel 21 and the wheel itself are made light in weight and have small moment of inertia as compared to that of fly wheel 12. Friction in the gear train is small as compared to the driving force of the fly wheel. Hence the greater part of the kinetic energy given up by the fly wheel is utilized in winding spring 34, and that small part which is otherwise used up is proportional to the total kinetic energy given up by fly wheel 12 for any particular speed measurement and does not change materially during the life of the device and can be compensated for in the calibration of the device and may be neglected in calculating the relation between the moment of inertia of the fly wheel 12 and the strength of spring required at 34.

Neglecting friction the kinetic energy of the fly wheel equals the potential energy transferred to spring 34 when the fly wheel is brought to rest. The kinetic energy of fly wheel 12 is equal to $.000764\ IS^2$ where $I$ = moment of inertia and $S$ speed in R. P. M. The potential energy transferred to spring 34 is equal to $.483\ T\theta^2 \times 10^{-6}$ where $T$ = torque of the spring in gram millimeters for a 90 degree deflection of pointer 33 and $\theta$ is the total deflection in degrees.

$$.000764\ IS^2 = .483\ T\theta^2 \times 10^{-6}$$

$$S = .0252\sqrt{\frac{T}{I}}\theta$$

If I use a steel fly wheel at 12 of one-inch radius and one-quarter inch thick and desire a 360 degree deflection of the pointer 33 when $S$ = 1800 R. P. M., a spring producing 10,000 gram millimeters counter torque at 90 degree deflection will be required.

Following a speed measurement, the irreversible gear train retains the spring wound to the maximum tension obtained when the fly wheel stops until the device is reset, and hence the speed on the scale 36 may be read at one's leisure. There is no error in such reading due to backlash in the gear train because the forces remain in such a direction that no backlash exists. No stop watch is required, one does not need to observe the device while in driving connection with a shaft such as 19, and such connection needs to be maintained only momentarily.

A pointer 38 on one of the intermediate shafts of the gear train need not necessarily be used but may be used on one or more of such intermediate shafts. Assuming that the gear ratio between pointers 38 and 33 is 5 to 1, pointer 38 will make five revolutions to one revolution of pointer 33. Dials 36 and 39 may be made to have the same diameters if desired.

While I have illustrated and described a particular embodiment of my invention, modifications thereof may occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. An inertia tachometer comprising a portable casing, an inertia rotor within said casing, provisions for connecting said rotor in direct driving relation with a rotating body to cause the rotor to be driven thereby whereby kinetic energy proportional to the speed of rotation of such rotating body may be stored in said rotor, and means in said casing for obtaining a measurement of the kinetic energy of said rotor in terms of the speed of such rotating body.

2. An inertia tachometer comprising a portable casing, an inertia rotor within said casing, means for temporarily directly driving said rotor from a rotating body the speed of which it is desired to measure to establish kinetic energy in said rotor proportional to the speed to be measured, means within said casing for converting the kinetic energy of said rotor into potential energy, and means in said casing for gauging such potential energy in terms of the speed of rotation of such rotating body.

3. An inertia tachometer comprising a portable supporting structure, an inertia rotor rotatively mounted on said structure, said rotor having a part exposed so as to be moved into and out of driving relation with a rotating body the speed of which it is desired to measure, a spiral spring on said supporting structure, a speed reducing gear train for winding said spring, said gear train including normally engaged parts which prevent the spring from unwinding but which may be disengaged to permit the spring to unwind, other means for establishing and interrupting a driving connection between said inertia rotor and gear train, means which may be adjusted to permit the winding of said spring in a given direction by said inertia rotor regardless of the direction of rotation of said rotor, and means for indicating the extent of winding of said spring in terms of the speed of such rotating body.

4. An inertia tachometer comprising a portable supporting structure, an inertia rotor rotatively mounted on said support and movable in its support along its axis of rotation between driven and driving positions, resilient means for urging said rotor toward the driving position, said rotor having a part exposed so as to be thrust into driving relation with a rotating body the speed of which is to be measured, such thrusting action causing the rotor to move into driven position, a pointer shaft, a spiral spring having one end secured to said shaft and its other end secured to said supporting structure, a speed reducing gear train for winding said spring, and clutch means for connecting said gear train in driving relation with said inertia rotor when the latter is moved to its driving position and for interrupting said driving relation when the inertia rotor is moved to its driven position.

5. An inertia tachometer comprising a supporting structure, a shaft rotatively mounted in said structure, a fly wheel secured to said shaft, one end of said shaft extending from said supporting structure so as to be thrust into driving relation with rotating apparatus the speed of which is to be measured, a thrust bearing resiliently supporting the opposite end of said shaft, said shaft being movable endwise in its support between a position which it assumes when thrust in driving relation with rotating apparatus and another position which it assumes when removed from such driving relation, a friction wheel which is engaged in driving relation with said fly wheel only when said shaft is in its last mentioned endwise position, a spring, a speed reducing gear train between said friction wheel and spring through which the spring may be wound up, a scale calibrated in speed units, and a pointer which is moved over said scale in proportion to the winding up of said spring.

6. An inertia tachometer comprising a portable casing, a shaft rotatively mounted within said casing and movable along its axis of rotation between different axial positions, a fly wheel secured in fixed relation on said shaft, said shaft extending from said casing so that it may be forcibly thrust endwise into driving engagement with a rotating body the speed of which it is desired to measure, such thrusting action causing the shaft to move to one of said axial positions and to be driven at the speed of such rotating body, resilient means opposing such axial movement for moving the shaft to the other axial position when the thrusting force is removed and such driving engagement is interrupted, a friction wheel which is engaged in driving relation with said fly wheel only when said shaft is in the last mentioned axial position, a spiral spring, a speed reducing one-way driving connection between said friction wheel and spring for winding said spring thereby to transform the kinetic energy of said fly wheel into potential energy in said spring, and means calibrated in speed of such rotating body for indicating the extent of winding of said spring.

7. An inertia tachometer comprising a portable casing, an inertia rotor rotatively mounted within said casing, provisions for connecting said rotor in driving relation with a rotating body the speed of which it is desired to measure so as to rotate said rotor at a corresponding speed, a spiral spring within said casing, winding means therefor, means for connecting said winding means in driving relation with said rotor so as to transform the kinetic energy of said rotor to potential energy in said spring, said inertia rotor being movable along its axis of rotation in one direction to establish driving relation with such rotating body and to interrupt its driving connection with the spring winding means and movable along its axis of rotation in the opposite direction to establish driving relation with the spring winding means and interrupt its driving relation with such rotating body, and means for indicating the extent of winding of said spring in terms of the speed of such rotating body.

8. An inertia tachometer comprising a portable casing, an inertia rotor within said casing, said rotor including a shaft having one end extending from said casing in one direction and having a pointed end thereon, a handle extending from said casing in the opposite direction whereby the pointed end of said shaft may be momentarily thrust into driving engagement with a rotating shaft the speed of which it is desired to measure for the purpose of driving said rotor and storing kinetic energy therein proportional to the speed to be measured, a spring within said casing, tensioning means therefor, means for connecting said inertia rotor in driving relation with said tensioning means to cause the kinetic energy of said rotor to be utilized in tensioning said spring, and means for indicating the tension of said spring, said indicating means being calibrated to indicate such tension in terms of the maximum speed of rotation of said inertia rotor at the beginning of a spring tensioning operation.

THEODORE A. RICH.